United States Patent Office

3,109,840
Patented Nov. 5, 1963

3,109,840
FORMAZANE DYESTUFFS CONTAINING
HEAVY METAL
Fabio Beffa and Guido Schetty, Basel, Switzerland, assignors to J. R. Geigy A.-G., Basel, Switzerland
No Drawing. Filed Dec. 23, 1960, Ser. No. 77,821
Claims priority, application Switzerland Dec. 24, 1959
6 Claims. (Cl. 260—149)

The present invention concerns new, heavy metal-containing dyestuffs of the formazane series, processes for the production thereof, also the use of these dyestuffs for the dyeing and printing of organic materials, in particular textile material, and, as industrial product, the material fast dyed with these dyestuffs.

It has been found that heavy metal-containing formazane compounds in which the heavy metal is co-ordinated at at least one sulphonylamido group of the formula

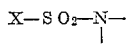

in which X is an organic radical, are stable dyestuffs which are well suited for dyeing purposes.

The dyestuffs according to the invention are the heavy metal complexes of formazane compounds of the general Formula I

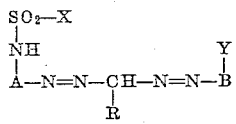    (I)

In this formula:

A and B each represent an aromatic radical, in particular a radical of the benzene or naphthalene series containing the group X—SO$_2$—NH— or Y in o-position to the azo linkage, R represents a monovalent substituent, e.g. a nitro, cyano, carbacyl, or arylaminocarbonyl group, advantageously an aromatic-isocyclic or aromatic-heterocyclic radical and, in particular, a radical of the benzene series, X represents an organic radical, and Y represents hydrogen or a substituent which may possibly be metallised, including the substituent

X—SO$_2$—NH—

The new formazane compounds used according to the invention of the general Formula I are obtained by methods known per se using starting materials which contain a group of the general Formula II

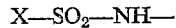    (II)

wherein

X has the meaning given above and

Z represents hydrogen or a substituent which can be exchanged therefor.

For example, an aryl diazonium compound containing a sulphonylamido group of the Formula II in o-position to the diazo group, in which the substituent Z is a radical which can be split off, preferably an acid radical and in particular an 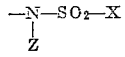 radical, is used; principally a diazo compound of the benzene series is used.

This aryl diazonium compound is coupled, for example, with an arylazomethylene or an arylazomethine compound coupling at the methylene or methine group respectively, and at a suitable stage in the formation of the formazane, the substituent Z is replaced by hydrogen, i.e. in the preferred case by saponification of a disulphonylamido group to the monosulphonylamido group X—SO$_2$—NH—. The second component, i.e. the arylazomethylene or arylazomethine compound, can also contain a metallisable group or a substituent which can be converted into such a group, in the aryl radical in o-position to the azo linkage such as, for example, again a disulphonylamido group or a carboxy, hydroxy or low alkoxy group. In this case, under suitable conditions, so-called tricyclic complexes are obtained in which the formazane chain and the two substituents in the o-position thereto take part in the complex formation.

Vice versa, the aryl diazonium compound containing the sulphonylamido substituent in the o-position to the diazo linkage can also be used for the production of an arylazomethylene or arylazomethine compound which can be coupled at the methylene or methine C atom respectively. It can be coupled actually by methods known per se with an acylacetic acid or an ester or arylamide thereof, e.g. with a formyl phenylacetic acid alkyl ester or with an acetoacetic acid arylamide, or with a cyanoacetic acid alkyl ester, and the coupling product can be saponified in an alkaline medium to form an arylazomethylene or arylazomethine compound which can be coupled. This is then coupled with a second aryl diazonium compound which can be identical with or different from the first to form the formazane compound.

In addition, to produce the formazane compounds used according to the invention, also the aryl diazonium compound containing the sulphonylamide group in o-position to the diazo linkage can first be reduced to the corresponding aryl hydrazine, this can be condensed with an aldehyde to form the hydrazone and the latter can be coupled with a second aryl diazonium compound which can be identical with or different from the first, to form the formazane compound. If the second diazo component does not contain a sulphonylamide group in o-position as defined or if, in place thereof, it contains a metallisable group of another type, e.g. a hydroxyl or carboxyl group, then the order of the diazo components can be reversed. In both cases, the same asymmetrical dyestuffs are obtained.

In the sulphonylamide group of the general Formula II, the sulphonyl group bound to aliphatic radicals is advantageous or, even better, it is bound to aromatic radicals. Principally the sulphonylamide groups are derived either from low aliphatic sulphonic acids, preferably from the methyl, chloromethyl, ethyl and propyl sulphonic acids or from sulphonic acids of the benzene series, mainly from benzene sulphonic acid, from homologous benzene sulphonic acids, from halogenated benzene sulphonic acids and also from those benzene sulphonic acids the benzene nuclei of which contain at least one water solubilising but not acid dissociating sulphonyl substituent such as, e.g., a methyl, chloromethyl or ethyl sulphonyl group.

In the starting materials used according to the invention, the group of the general Formula II is advantageously a disulphonylamide group. Preferred starting materials are obtained, for example, by diacylating the amino group in o-nitroaminophenyl compounds. These can be reacted, for example, with 2 mols of alkyl or aryl sulphonic acid chloride or with first one mol and then with another mol of two different sulphonic acid chlorides, advantageously in the presence of tertiary nitrogen bases such as, e.g. in a mixture of pyridine bases, and possibly in the presence of an inert organic solubility promoter. The nitro group is then reduced to the amino group, advantageously in a neutral medium with catalytically activated hydrogen or in a weakly acid medium according to Béchamp. The o-aminodisulphonylamidophenyl compounds so obtained are used as starting materials for the production of dyestuffs according to the invention in the form of their diazonium compounds or possibly after conversion into the corresponding hydrazine compounds and condensation with aldehydes to form hydrazone compounds.

The other starting materials necessary for the production of formazane compounds of the general Formula I usable according to the invention are diazo components not containing metallisable groups, or o-hydroxy- or o-carboxy-aryl diazonium compounds, also aldehydes in the form of the hydrazones mentioned above and, finally, methylene or methine compounds which can be coupled twice.

The components know in azo and formazane chemistry can be used as diazo components. In this case too, those of the benzene and naphthalene series are preferred. Instead of the o-hydroxy- or o-carboxy-aryl diazonium compounds, possibly also the corresponding compounds can be used which contain in the o-position a substituent which can be converted into such a metallisable group. In this case, the substituent is converted into the metallisable group in a suitable step.

Aromatic aldehydes are used principally for the production of the hydrazone as they lead to particularly valuable mesoaryl formazane dyestuffs. For example, benzaldehyde, tolualdehyde, 3-nitrobenzaldehyde, 2- or 4-chlorobenzaldehyde, 2,4-dichlorobenzaldehyde, benzaldehyde-2, 4-disulphonic acid, anisaldehyde, vanillin, 4-dimethyl- or 4-diethyl- aminobenzaldehyde and 4-dihydroxyethylaminobenzaldehyde are used. Also heterocyclic aldehydes such as, e.g., furfural and pyridine or quinoline and benzimidazole aldehydes can be used and, finally, valuable end products are also obtained with aliphatic or aralphatic aldehydes such as, e.g. acetaldehyde, crotonaldehyde, caproaldehyde, phenacetaldehyde or cinnamaldehyde.

Also α-carbonyl alkanes such as, e.g. acetone, acetophenone, as well as chlorinated and/or halogenated acetophenones, then nitroalkanes such as nitromethane, also derivatives of malonic acid such as, e.g. their esters and amides and, finally, also azolium salts containing activated methyl groups such as, e.g., the 2,3-dimethylbenzthiazolium or 2,3-dimethylselenazolium or 1,2,3-trimethylbenzimidazolium salts can be used in addition to the acyl and cyano acetic acid derivatives mentioned above as examples, as methylene or methine compounds which can be coupled twice at the methylene or methine C atom respectively, this possibly whilst splitting off substituents.

The starting materials necessary for the production of the formazane compounds of the general Formula I can contain the substituents usual in azo dyestuffs, e.g., halogen, alkyl, aralkyl, and aryl groups, alkoxy and aryloxy groups, cyano, nitro, sulphonic acid, sulphonic acid amide, sulphonic acid ester, carboxylic acid, carboxylic acid amide, alkylsulphonyl and arylsulphonyl groups, arylazo groups, then secondary or tertiary amino groups and, finally, also acylamino groups such as, e.g., the acetylamino and chloroacetylamino group.

The usual heavy metals of the atomic numbers 24 to 29 are used as agents giving off heavy metal for the metallisation of the metal-free formazane compounds of the general Formula I. Chromium, cobalt, nickel salts and chiefly the copper salts of mineral acids or of low fatty acids are used. It is also possible to use the complex salts of these metals, in which case it is possible for the groups bound in complex linkage to the metal to appear in the end product. When mineral acid salts are used, the metallisation is performed advantageously in the presence of an agent which buffers the mineral acid, as which are used in particular alkali hydroxides or carbonates or alkali metal salts of low fatty acids such as, e.g. alkali acetates, or alkali metal salts of polybasic oxygen acids of phosphorus, or ammonia or tertiary nitrogen bases such as, e.g., pyridine bases. The metallisation agent is used in at least equimolar amounts so that there is at least 1 heavy metal atom per mol dyestuff. Often the metallisation is completed even at room temperature, in many cases however, a light heating, e.g. to about 80°, is necessary. In the process according to the invention, agents giving off nickel and, chiefly copper are the preferred metallising agents as with these, end products having particularly good dyeing properties are obtained.

A modification of the process according to the invention consists in starting from metallisable intermediate products of formazane compounds of the general Formula I, first metallising these and only then forming the finished dyestuff. Such intermediate products correspond, for example, to the general Formula III

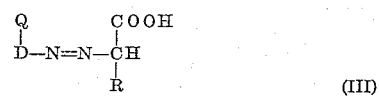

(III)

wherein

D represents an aryl radical corresponding to A or B,
Q represents a metallisable group in o-position to the azo linkage, and
R has the meaning given in Formula I.

These intermediates are obtained by coupling 1 mol of an aryl diazonium compound with a methylene or methine compound which, after completion of the coupling at the methine C atom, also contains a carboxyl group or a substituent which can be converted into such a group such as, e.g. a cyano group or a carboxylic acid ester group. After such a substituent has been converted into the carboxyl group if necessary, the intermediate product of the above formula is treated with the agent giving off heavy metal and then coupled with 1 mol of an aryl diazonium compound to form the metal-containing formazane dyestuff. Of the aryl diazonium compounds used for the two couplings, as defined at least one must contain as metallisable group a substituent of the general Formula II in o-position to the diazo group. In this modified process, the metallisation and the second coupling are performed in one single step. If the second coupling is performed in a sufficiently alkaline medium, then immediately beforehand also the cyano or carboxylic acid ester group can be saponified in the same reaction medium.

The preferred formazane dyestuffs containing heavy metal correspond to the general formula

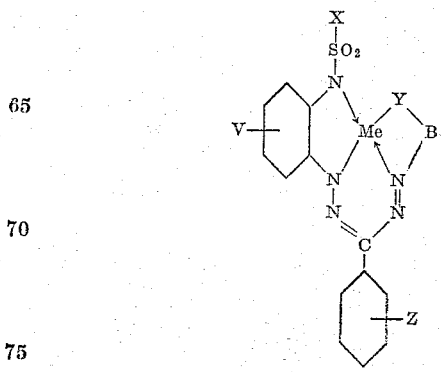

wherein

B represents a radical of the benzene series,

Me represents a heavy metal selected from the group consisting of Cu and Ni,

V represents a member selected from the group consisting of hydrogen, methyl and methoxy radicals, X represents a member selected from the group consisting of lower aliphatic, phenyl, chlorophenyl, lower alkylphenyl, lower alkoxyphenyl, lower alkylsulphonylphenyl, sulphamylphenyl and N-lower alkylsulphamylphenyl radicals, Y represents a metal binding group in o-position to the azo bond selected from the group consisting of —O— and —OOC—, and Z represents a member selected from the group consisting of hydrogen, chlorine, methyl and sulphonic acid groups.

The phenyl nucleus B can be unsubstituted or substituted, for example, by chlorine or the nitro group. However, advantageously it contains a group which increases the water solubility such as the sulphonic acid group or, in particular, a functionally converted sulphonic acid group such as alkylsulphonyl, arysulphonyl and sulphonic acid amide groups, examples of which are the —SO$_2$NH$_2$, —SO$_2$NH-alkyl, —SO$_2$NH-aryl, —SO$_2$N-dialkyl and

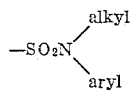

groups.

Particularly valuable dyestuffs are those in which Me is copper and Y is —O—.

The heavy metal-containing formazane dyestuffs produced according to the invention are worked up and isolated in the usual ways. Sometimes it is necessary to finally cleanse them to remove undesired side products, for example by dissolving and allowing to crystallise. Depending on the constitution, red, brown, blue, violet, green to grey powders are obtained.

Dyestuffs according to the invention which do not contain water solubilising groups are used as pigments and can be employed, for example, for the dyeing of synthetic materials, lacquers, varnishes or spinning masses consisting of acetyl-cellulose or polyamides.

Those dyestuffs which contain water solubilising groups such as, e.g. carboxylic acid or phosphonic acid and, mainly, sulphonic acid groups, are suitable for the dyeing and printing of leather, paper, and fibrous material of the most different types, in particular of textile material of natural or synthetic origin containing polypeptide groups such as, e.g. wool, silk, and nylon. For textile materials of this type, in particular those dyestuffs are used advantageously which contain a sulphonic acid group, as many of them draw onto this material even from a weakly acid bath. Another valuable group are those dyestuffs according to the invention which, apart from groups possibly taking part in the complex formation, contain no acid dissociating groups, i.e. no carbocylic acid and sulphonic acid groups, but contain only substituents favouring the water solubility such as, e.g. low alkylsulphonyl groups, sulphonic acid amide groups and, at most, sulphonic acid amide groups substituted by low molecular hydrocarbon radicals. These dyestuffs have a very good affinity to wool and material having similar dyeing behaviour and they completely draw onto such materials from even a neutral to weakly acid bath. If desired, the water solubility of such dyestuffs not containing sulphonic acid groups can be improved by the admixture of anion active or non-ionogenic wetting or dispersing agents or of reducing agents.

The textile dyeings produced with the dyestuffs according to the invention are distinguished particularly by their good fastness to light and rubbing and the excellent wet fastness properties such as, e.g., the good fastness to washing, alkali, milling, sea water and decatising. In addition, the dyeings are very pure and level.

Further details can be seen from the following examples. Where not otherwise expressly stated, parts are given therein as parts by weight. The temperatures are in degrees centigrade. The relationship of parts by weight to parts by volume is as that of grammes to cubic centimetres.

EXAMPLE 1

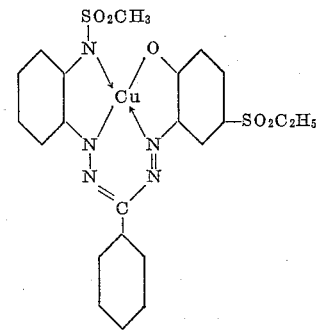

26.4 parts of N-di-(methylsulphonyl)-amino-2-aminobenzene are dissolved in a mixture of 50 parts by volume of glacial acetic acid, 35 parts of concentrated hydrochloric acid and 50 parts of warm water and the solution is quickly diazotised at 0–5° with 16.6 parts by volume of 33.3% sodium nitrite solution. The diazonium solution is added dropwise while stirring well to a suspension of 20.4 parts of phenylformyl acetic acid ethyl ester in 200 parts of water, 250 parts by volume of dioxan and 10.6 parts by volume of a 10 N-caustic soda lye, the addition being made at 0–10° and in the presence of such amounts of calcinated sodium carbonate that afterwards the reaction mixture has a weakly phenolphthalein alkaline reaction. On completion of the coupling, the reaction is made weakly alkaline to brilliant yellow paper by the addition of concentrated hydrochloric acid, the whole is diluted and brought to the boil. After the addition of sufficient 10 N-caustic soda lye to ensure a strong alkaline reaction until the end of the saponification, the reaction product is refluxed for 10 minutes. The solution of the saponification product is then made weakly alkaline to brilliant yellow paper by the addition of concentrated hydrochloric acid, 31 parts of calcinated sodium carbonate are added and the whole is coupled at 10–15° in the presence of 25 parts of crystallised copper sulphate (mol. weight 250) with the diazonium salt obtained by diazotising 20.1 parts of 2-amino-1-hydroxybenzene-4-ethyl sulphone. On completion of the coupling, the formazane copper complex compound is salted out at 80° and filtered off. After drying, dark powder is obtained which dyes wool, natural silk and polyamide fibres in intensive, pure blue shades.

If in the above example, the 2-amino-1-hydroxybenzene-4-ethyl sulphone is replaced by 18.7 parts of 2-amino-1-hydroxybenzene-4-methyl sulphone or by 24.9 parts of 2-amino-1-hydroxybenzene-4-phenyl sulphone, then dyestuffs having similar properties are obtained.

If, instead of using phenyl formyl acetic acid ethyl ester as coupling component, 17.7 parts of acetoacetic acid phenylamide or 21.2 parts of p-chloro-acetoacetic acid phenylamide are used and the saponification is performed in the presence of sodium sulphite, then similar dyestuffs are obtained which dye wool in blue-violet shades.

EXAMPLE 2

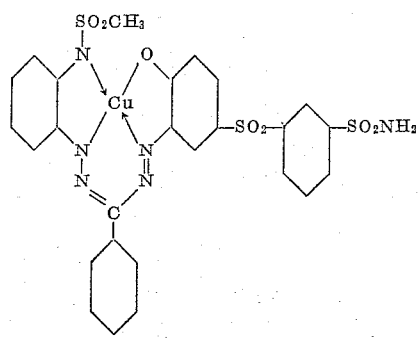

32.8 parts of 2-amino-1-hydroxybenzene-4-phenylsulphone-3′-sulphonic acid amide are dissolved in 100 parts of hot water and 21 parts by volume of 10 N-caustic soda lye, a solution of 6.9 parts of sodium nitrite is added and, after cooling to 5°, the whole is stirred into a mixture of 42 parts of concentrated hydrochloric acid, 100 parts of water and 30 parts of ice. Traces of excess nitrous acid are decomposed with sulphamic acid. Sodium bicarbonate is then added until the reaction is neutral to Congo red paper and the brown-yellow suspension of the diazonium compound is poured at 0–10° into the suspension of 36.7 parts of the hydrazone (from 2-[N-di - (methylsulphonyl) - amino]-phenylhydrazine and benzaldehyde) M.P. 195–196° in 200 parts by volume of pyridine and 25 parts by volume of concentrated ammonia solution.

On completion of the coupling, 150 parts by volume of copper tetramine sulphate solution (corresponding to 6.4 parts of copper) are added to the violet suspension of the dyestuff. After the addition of 10 N-caustic soda lye until the reaction is alkaline to mimosa paper, the tricyclic blue formazane copper complex forms whilst a methylsulphonyl group is split off. This complex is precipitated by the addition of sodium chloride solution at 75°. It is filtered off, washed with dilute sodium chloride solution and dried. After drying, it is a dark powder which dyes wool, natural silk and polyamide fibres in fast blue shades.

If in the above example, the 2-amino-1-hydroxybenzene-4-phenyl sulphone-3′ sulphamide is replaced by 37.1 parts of 2-amino-1-hydroxybenzene-4-sulphethyl anilide-4′-sulphamide or by 26.4 parts of 2-amino-1-hydroxybenzene - 4 - sulphanilide, then dyestuffs having similar properties are obtained.

EXAMPLE 3

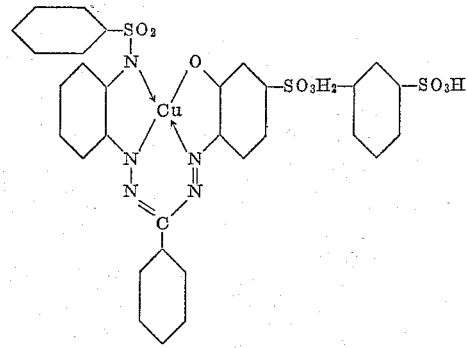

32.9 parts of 2-amino-1-hydroxybenzene-4-phenylsulphone-3′-sulphonic acid are dissolved in 100 parts of hot water and 21 parts by volume of 10 N-caustic soda lye, a solution of 6.9 parts of sodium nitrite is added and, after cooling to 5°, the whole is stirred into a mixture of 42 parts of concentrated hydrochloric acid and 100 parts of ice water. The suspension of the diazo compound is then made neutral to Congo red paper by the addition of sodium bicarbonate and then coupled at 0–10° as described in Example 2 with 49.1 parts of the hydrazone from 2-[N-di-(phenylsulphonyl)-amino]-phenyl hydrazine and benzaldehyde. On completion of the coupling, 150 parts by volume of copper tetramine sulphate solution corresponding to 6.4 parts of copper) are added to the violet suspension of the dyestuff. After the addition of 10 N-caustic soda lye and stirring the reaction mixture for several hours, the tricyclic blue formazane complex is formed whilst a phenylsulphonyl group is split off, which complex is precipitated, after quickly heating to 70–80°, by the addition of sodium chloride solution. It is filtered off, washed with dilute sodium chloride solution and dried. After drying it is a dark powder which dyes wool, natural silk and polyamide fibres in beautiful blue shades which have good fastness properties.

EXAMPLE 4

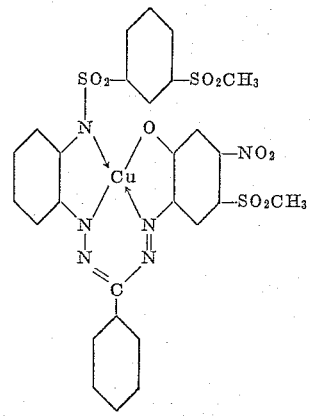

54.4 parts of N-di-(3′-methylsulphonyl-phenylsulphonyl)-amino-2-aminobenzene are added at 0–10° while stirring well to 74 parts of 18.3% nitrosyl sulphuric acid. The pale brown paste is then dissolved while stirring in ice water. The clear solution of the diazonium compound is then coupled as described in Example 1 with 20.4 parts of phenyl formyl acetoacetic acid ethyl ester. At the same time, sufficient caustic soda lye is added to ensure that after the addition of the diazonium component, the reaction mixture has a weakly phenolphthalein alkaline reaction. On completion of the coupling, the reaction is made weakly alkaline to brilliant yellow paper by the addition of concentrated hydrochloric acid. The whole is diluted with water and boiled. Sufficient 10 N-caustic soda lye is then added to the reaction mixture to ensure that there is a strong alkaline reaction until the end of the saponification, and the reaction product is refluxed for 10 minutes. After the addition of 150 parts by volume of dioxan, the solution of the saponification product is again made weakly alkaline to brilliant yellow paper with concentrated hydrochloric acid, 31 parts of calcinated sodium carbonate are added and the whole is coupled at 10–15° in the presence of 25 parts of crystalline copper sulphate (mol. weight 250) with the diazonium salt obtained by diazotising 23.2 parts of 5-nitro-2-amino-1-hydroxybenzene-4-methylsulphone. On completion of the coupling, the formazane copper complex is salted out at 80°, filtered off and dried. It is a dark powder which dyes wool in fast greenish blue shades.

Dyestuffs having similar properties are obtained if in the above example, the 5-nitro-2-amino-1-hydroxybenzene-4-methylsulphone is replaced by 15.4 parts of 4-nitro-2-amino-1-hydroxybenzene or by 23.2 parts of 6-nitro-2-amino-1-hydroxybenzene-4-methyl sulphone.

EXAMPLE 5

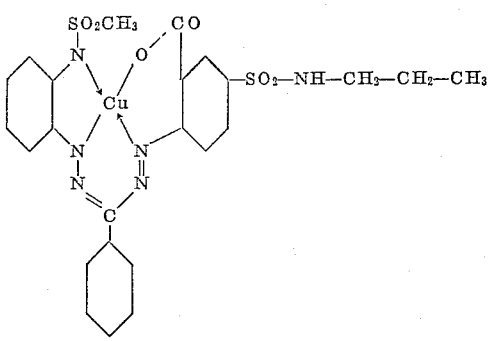

25.8 parts of 2-aminobenzoic acid-5-sulphonic acid-n-propylamide are indirectly diazotised by the usual method and coupled with 20.4 parts of phenylformyl acetic acid ethyl ester under the conditions described in Example 1. After the addition of sufficient caustic soda lye to ensure a strong alkaline reaction until the end of the saponification, the coupling product is refluxed for 10 minutes. The solution of the saponification product is made weakly alkaline to brilliant yellow paper by the addition of hydrochloric acid, 150 parts of crystallised copper sulphate solution (corresponding to 25 parts of crystallised copper sulphate) are added at 0–10° and the whole is coupled in the presence of calcinated sodium carbonate with the diazonium salt obtained according to Example 1 by diazotising 26.4 parts of N-di-(methylsulphonyl)-amino-2-aminobenzene. The dicyclic formazane copper complex is red coloured when it precipitates. It is filtered off and washed with cold water. It is converted into the blue tricyclic formazane copper complex by treating with caustic soda lye in glycol monomethyl ether whilst splitting off a methylsulphonyl group. The dyestuff is precipitated by the addition of sodium chloride solution, filtered off and washed. After drying, it is a dark powder which dyes wool in very fast, pure blue shades.

EXAMPLE 6

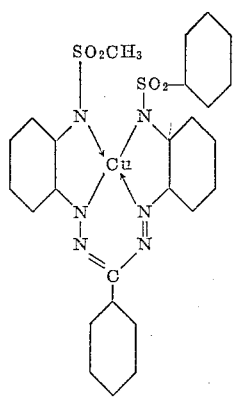

26.4 parts of N-di-(methylsulphonyl)-amino-2-aminobenzene are diazotised as described in Example 1, coupled with 20.4 parts of phenyl formyl acetic acid ethyl ester and saponified with caustic soda lye. The alkaline solution of the saponification product is coupled with the diazonium salt obtained by diazotising 38.8 parts of N-di-(phenylsulphonyl)-amino-2-aminobenzene, sufficient sodium carbonate being added to ensure an alkaline reaction until the coupling is complete. The precipitated brown-red dyestuff is filtered off and washed with cold water. By dissolving the dyestuff in 300 parts by volume of glycol monomethyl ether and adding caustic soda lye, a phenylsulphonyl group is split off. The violet solution of the formazane dyestuff is made weakly alkaline to litmus paper by the addition of acetic acid, 150 parts by volume of copper sulphate solution (corresponding to 6.4 parts of copper) are added and the whole is heated at 80–90° until the blue copper complex compound has formed. The dyestuff is precipitated by the addition of sodium chloride solution, filtered off, washed with dilute sodium chloride solution and dried. It dyes polyamide fibres in fast, blue shades.

EXAMPLE 7

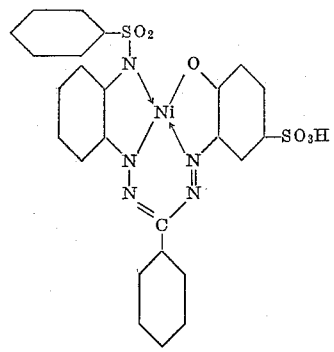

38.8 parts of N-di-(phenylsulphonyl)-amino-2-aminobenzene in 250 parts by volume of glycol monomethyl ether, 35 parts of concentrated hydrochloric acid and 20 parts of water are directly diazotised at 0–5° with 16.6 parts by volume of 33.3% sodium nitrite solution, the diazonium salt is coupled with 20.4 parts of phenyl formyl acetic acid ethyl ester and the coupling product is saponified with caustic soda lye. The solution of the saponification product is made alkaline to brilliant yellow paper by the addition of concentrated hydrochloric acid and at 10–15°, 150 parts by volume of dioxan and 150 parts by volume of a nickel sulphate solution (corresponding to 5.9 parts of nickel) are added. The whole is coupled in the presence of 31 parts of calcinated sodium carbonate with the diazonium salt obtained by diazotising 18.9 parts of 2-amino-1-hydroxybenzene-4-sulphonic acid. On completion of the reaction, the formazane nickel complex compound is salted out at 70°, filtered off and washed with sodium chloride solution. After drying, a dark powder is obtained which dyes wool from a weakly acid bath in fast violet shades.

EXAMPLE 8

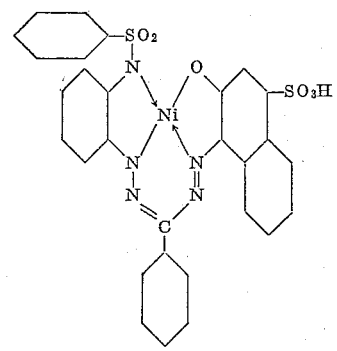

38.8 parts of N-di-(phenylsulphonyl)-amino-2-aminobenzene are diazotised as described in Example 7 and coupled with 20.4 parts of phenyl formyl acetic acid ethyl ester. On completion of the coupling, the reaction mixture is made alkaline to brilliant yellow paper by the addition of concentrated hydrochloric acid, then diluted and boiled. After the addition of sufficient 10 N-caustic soda lye to ensure a strong alkaline reaction until the end of the saponification, the reaction product is refluxed for 15 minutes. The solution of the saponification product is then made alkaline to brilliant yellow paper again by the addition of concentrated hydrochloric acid, 100 parts by volume of dioxan are added and, at 10–15°, 150 parts by volume of a nickel sulphate solution (corresponding to 5.9 parts of nickel) are added. The whole is coupled in the presence of 31 parts of calcinated sodium carbonate with 25 parts of the diazonium oxide of 1-amino-2-hydroxynaphthalene-4-sulphonic acid. On completion of the coupling and complex formation, the formazane nickel complex compound is salted out at 60°, filtered off and washed with dilute sodium chloride solution. After drying, a dark powder is obtained which dyes wool in fast beautiful reddish blue shades.

EXAMPLE 9

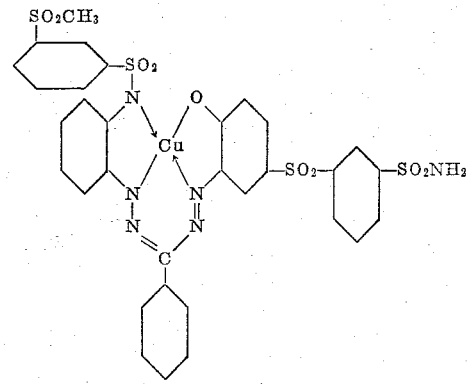

54.4 parts of N - di-(3'-methylsulphonylphenylsulphonyl)amino-2-aminobenzene are diazotised as described in Example 4 and coupled with 20.4 parts of phenyl formyl acetic acid ethyl ester. On completion of the coupling, the reaction mixture is made alkaline to brilliant yellow paper by the addition of concentrated hydrochloric acid, diluted and boiled. After the addition of sufficient 10 N-caustic soda lye to ensure a strong alkaline reaction until the end of the saponification, the reaction product is refluxed for 10 minutes. After the addition of 150 parts by volume of dioxan, the solution of the saponification product is then made alkaline to brilliant yellow paper by the addition of hydrochloric acid at 10–15° and at this temperature, 150 parts of a copper sulphate solution (corresponding to 6.4 parts of copper) are added. The olive green suspension is coupled in the presence of 31 parts of calcinated sodium carbonate with the diazonium salt obtained by diazotising 32.8 parts of amino-1-hydroxybenzene-4-phenylsulphone - 3' - sulphonic acid amide. On completion of the reaction, the formazane copper complex compound is salted out at 80°, filtered off, washed with dilute sodium chloride solution and dried. After drying, a dark powder is obtained which dyes wool from a neutral bath in very fast pure blue shades.

If in the above example the 2-amino-1-hydroxybenzene-4-phenylsulphone-3'-sulphonic acid amide is replaced by 18.7 parts of 2-amino-1-hydroxybenzene-4-methylsulphone or by 20.1 parts of 2-amino-1-hydroxybenzene-4-ethylsulphone, then dyestuffs having similar properties are obtained.

The dyestuffs given in the following table are also produced by the processes described in the Examples 1 to 9.

Table

| No. | Formazane Compound | Metal | Shade on wool |
|---|---|---|---|
| 1 | N-(2-hydroxy-5-methylsulphonylphenyl)-N'-(2'-methylsulphonylaminophenyl)-ms-phenyl-formazane. | Ni | violet. |
| 2 | N-(2-hydroxy-5-ethylsulphonylphenyl)-N'-(2'-methylsulphonylaminophenyl)-ms-phenyl-formazane. | Ni | Do. |
| 3 | N-(2-hydroxy-5-n-propylsulphonylphenyl)-N'-(2'-methylsulphonylaminophenyl)-ms-phenyl-formazane. | Cu | blue. |
| 4 | ---do--- | Ni | violet. |
| 5 | N-(2-hydroxy-5-ethylsulphonylphenyl)N'-(2'-ethylsulphonylaminophenyl)-ms-phenyl-formazane. | Cu | blue. |
| 6 | ---do--- | Ni | violet. |
| 7 | N-(2-hydroxy-5-n-propylsulphonylphenyl)-N'-(2'-ethylsulphonylaminophenyl)-ms-phenyl-formazane. | Cu | blue. |
| 8 | N-(2-hydroxy-5-phenylsulphonylphenyl)-N'-(2'-methylsulphonylaminophenyl)-ms-phenyl-formazane. | Ni | violet. |
| 9 | N-(2-hydroxy-5-phenylsulphonylphenyl)-N'-(2'-ethylsulphonylaminophenyl)-ms-phenyl-formazane. | Cu | blue. |
| 10 | ---do--- | Ni | violet. |
| 11 | N-[2-hydroxy-5-(m-sulphonic acid amide)-phenyl-sulphonylphenyl]-N'-(2'-ethyl-sulphonylaminophenyl)-ms-phenyl-formazane. | Cu | blue. |
| 12 | N-[2-hydroxy-5-(m-sulphonic acid methylamide)-phenylsulphonylphenyl]-N'-(2'-ethylsulphonylaminophenyl)-ms-phenyl-formazane. | Cu | Do. |
| 13 | N-[2-hydroxy-5-(m-sulphonic acid)-phenylsulphonylphenyl]-N'-(2'-ethylsulphonylaminophenyl)-ms-phenyl-formazane. | Cu | Do. |
| 14 | N-[2-hydroxy-5-(m-sulphonic acid)-phenylsulphonylphenyl]-N'-(2'-p-chlorophenylsulphonylaminophenyl)-ms-phenyl-formazane. | Cu | Do. |
| 15 | ---do--- | Ni | violet. |
| 16 | N-[2-hydroxy-5-(m-sulphonic acid)-phenylsulphonylphenyl]-N'-(2'-p-methylphenylsulphonylaminophenyl)-ms-phenyl-formazane. | Cu | blue. |
| 17 | ---do--- | Ni | violet. |
| 18 | N-[2-hydroxy-5-(sulphonic acid phenylamide)-phenyl]-N'-(2'-ethylsulphonylaminophenyl)-ms-phenyl-formazane. | Cu | blue. |
| 19 | N-[2-hydroxy-5-(sulphonic acid phenylamide)-phenyl]-N'-(2'-n-propysulphonylaminophenyl)-ms-phenyl-formazane. | Cu | Do. |
| 20 | ---do--- | Ni | violet. |
| 21 | N-[2-hydroxy-5-(sulphonic acid phenylamide)-phenyl]-N'-(2'-phenylsulphonylaminophenyl)-ms-phenyl-formazane. | Cu | blue. |
| 22 | N-[2-hydroxy-5-(sulphonic acid-p-hydroxyphenylamide)-phenyl]-N'-(2'-methylsulphonylaminophenyl)-ms-phenyl-formazane. | Cu | Do. |
| 23 | N-[2-hydroxy-5-(sulphonic acid-p-hydroxyphenylamide)-phenyl]-N'-(2'-phenylsulphonylaminophenyl)-ms-phenyl-formazane. | Cu | Do. Do. |
| 24 | N-[2-hydroxy-5-(sulphonic acid phenylamide)-phenyl]-N'-(2'-m-methylsulphonylphenylsulphonylaminophenyl)-ms-phenyl-formazane. | Cu | Do. |
| 25 | N-[2-hydroxy-5-(sulphonic acid phenylamide)-phenyl]-N'-(2'-p-chlorophenylsulphonylaminophenyl)-ms-phenyl-formazane. | Cu | Do. |
| 26 | N-(2-hydroxy-5-methylsulphonylphenyl)-N'-(2'-phenyl-sulphonylaminophenyl)-ms-phenyl-formazane. | Cu | Do. |
| 27 | N-(2-hydroxy-5-ethylsulphonylphenyl)-N'-(2'-phenylsulphonylaminophenyl)-ms-phenyl-formazane. | Cu | Do. |
| 28 | N-(2-hydroxy-3-nitro-5-methylsulphonylphenyl)-N'-(2'-phenylsulphonylaminophenyl)-ms-phenyl-formazane. | Cu | greenish blue. |
| 29 | N-(2-hydroxy-5-nitrophenyl)-N'-(2'-phenylsulphonyl-aminophenyl)-ms-phenyl-formazane. | Cu | blue. |
| 30 | N-(2-hydroxy-4-nitro-5-methylsulphonylphenyl)-N'-(2'-phenylsulphonylaminophenyl)-ms-phenyl-formazane. | Cu | greenish blue. |
| 31 | N-[2-carboxy-4-(sulphonic acid methylamide)-phenyl]-N'-(2'-phenylsulphonylaminophenyl)-ms-phenyl-formazane. | Cu | blue. |
| 32 | N-[2-carboxy-4-(sulphonic acid phenylamide)-phenyl]-N'-(2'-phenylsulphonylaminophenyl)-ms-phenyl-formazane. | Cu | Do. |
| 33 | N-[2-carboxy-4-(sulphonic acid-N-methylphenylamide)-phenyl]-N'-(2'-phenylsulphonylaminophenyl)-ms-phenyl-formazane. | Cu | Do. |
| 34 | N-[2-carboxy-4-(sulphonic acid amide)-phenyl]-N'-(2'-phenylsulphonylaminophenyl)-ms-phenyl-formazane. | Ni | brown. |
| 35 | N-(2-carboxy-4-sulphonic acid amide-phenyl)-N'-(2'-methylsulphonylaminophenyl)-ms-phenyl-formazane. | Cu | blue. |
| 36 | N-(2-carboxy-4-sulphonic acid amide-phenyl)-N'-(2'-n-propylsulphonylaminophenyl)-ms-phenyl-formazane. | Cu | Do. |
| 37 | N-[2-carboxy-4-(sulphonic acid-N-methylphenylamide)-phenyl]-N'-(2'-methylsulphonylaminophenyl)-ms-phenyl-formazane. | Cu | Do. |
| 38 | N-(2-carboxy-4-sulphonic acid amide phenyl)-N'-(5'-methyl-2'-methylsulphonylaminophenyl)-ms-phenyl-formazane. | Cu | Do. |
| 39 | N-(2-carboxy-4-sulphonic acid amide phenyl)-N'-(5'-methoxy-2'-methylsulphonylaminophenyl)-ms-phenyl-formazane. | Cu | Do. |
| 40 | N-[2-hydroxy-5-(m-sulphonic acid amide)-phenylsulphonylphenyl]-N'-(2'-phenylsulphonylaminophenyl)-ms-phenyl-formazane. | Cu | Do. |

TABLE—Continued

| No. | Formazane compound | Metal | Shade on wool |
|---|---|---|---|
| 41 | N-(2-hydroxy-3-nitro-5-methylsulphonylphenyl)-N'-(2'-methylsulphonylaminophenyl)-ms-phenyl-formazane. | Cu | Do. |
| 42 | N-(2-hydroxy-4-nitro-5-methylsulphonylphenyl)-N'-(2'-methylsulphonylaminophenyl)-ms-phenyl-formazane. | Cu | greenish blue. |
| 43 | N-(2-hydroxy-5-nitrophenyl)-N'-(2'-methylsulphonylaminophenyl)-ms-phenyl-formazane. | Cu | blue. |
| 44 | N-(2-hydroxy-5-nitrophenyl-3-sulphonic acid)-N'-(2'-phenylsulphonylaminophenyl)-ms-phenyl-formazane. | Cu | Do. |
| 45 | N-[2-hydroxy-5-(m-sulphonic acid amide)-phenyl-phenyl]-N'-(2'-phenylsulphonylaminophenyl)-ms-phenyl-formazane. | Cu | Do. |
| 46 | N-[2-hydroxy-4-sulphonic acid naphthyl-(α)]-N'-(2''-phenylsulphonylaminophenyl)-ms-phenyl-formazane. | Cu | blueish green. |
| 47 | N-[2-hydroxy-6-nitro-4-sulphonic acid naphthyl-(α)]-N'-(2'-phenylsulphonylaminophenyl)-ms-phenyl-formazane. | Cu | olive green. |
| 48 | do | Ni | violetty grey. |
| 49 | N-(2-hydroxy-5-ethylsulphonylphenyl)-N'-(2'-p-chlorophenylsulphonylaminophenyl)-ms-phenyl-formazane. | Cu | blue. |
| 50 | N-[2-hydroxy-5-(m-sulphonic acid amide)-phenylsulphonylphenyl]-N'-(2'-p-chlorophenylsulphonylaminophenyl)-ms-phenyl-formazane. | Cu | Do. |
| 51 | N-[2-hydroxy-5-(sulphonic acid-N-ethyl-N-4''-sulphophenylamide)-phenyl]-N'-(2'-phenylsulphonylaminophenyl)-ms-phenyl-formazane. | Cu | Do. |
| 52 | N-[2-hydroxy-5-(sulphonic acid-p-hydroxyphenylamide)-phenyl]-N'-(2'-m-methylsulphonylphenylsulphonylaminophenyl)-ms-phenyl-formazane. | Cu | Do. |
| 53 | N-[2-hydroxy-5-(sulphonic acid methylamide)-phenyl]-N'-(2'-m-methylsulphonylphenysulphonylaminophenyl)-ms-phenyl-formazane. | Cu | Do. |
| 54 | N-(2-hydroxyphenyl)-N'-[2'-(m-sulphonic acid amide-phenylsulphonylamino)-phenyl]-ms-o-chlorophenyl-formazane. | Cu | Do. |
| 55 | do | Ni | violet. |
| 56 | N-(2-hydroxy-5-chlorophenyl)-N'-[2'-(m-sulphonic acid diethylamide phenylsulphonylamino)-phenyl]-ms-o-sulphonic acid phenyl-formazane. | Cu | blue. |
| 57 | do | Ni | violet. |
| 58 | N-(2-hydroxy-5-sulphonic acid dimethylamide-phenyl)-N'-[2'-(m-sulphonic acid methylamide-phenylsulphonylamino)-phenyl]-ms-p-methylphenyl-formazane. | Cu | blue. |
| 59 | do | Ni | violet. |
| 60 | N-[2-hydroxy-5-(sulphonic acid-N-ethyl-N-4''-sulphophenylamide)-phenyl]-N'-(2'-p-ethylphenylsulphonyl-aminophenyl)-ms-phenyl-formazane. | Cu | blue. |
| 61 | do | Ni | violet. |
| 62 | N-[2-hydroxy-5-(sulphonic acid-N-ethyl-N-4''-sulphophenylamide)-phenyl]-N'-(2'-p-methoxyphenylsulphonyl-amino-5'-methyl-phenyl)-ms-phenyl-formazane. | Cu | blue. |
| 63 | N-[2-hydroxy-5-(sulphonic acid-N-ethyl-N-4''-sulphophenylamide)-phenyl]-N'-(2'-p-methoxyphenylsulphonylamino-5'-methoxy-phenyl)-ms-phenyl-formazane. | Cu | Do. |
| 64 | N-[2-hydroxy-5-(sulphonic acid-N-ethyl-N-4''-sulphophenylamide)-phenyl]-N'-(2'-p-ethoxyphenylsulphonylaminophenyl)-ms-phenyl-formazane. | Cu | Do. |
| 65 | N-[2-hydroxy-5-(sulphonic acid-N-ethyl-N-3''-sulphophenylamide)-phenyl]-N'-(2'-p-ethoxyphenyl-sulphonyl-aminophenyl)-ms-phenyl-formazane. | Cu | Do. |
| 66 | N-(2-hydroxy-5-chloromethylsulphonylphenyl)-N'-(2'-m-ethylsulphonylphenylsulphonylaminophenyl)-ms-phenyl-formazane. | Cu | Do. |
| 67 | N-(2-hydroxy-5-n-butylsulphonylphenyl)-N'-(2'-m-ethyl-sulphonylphenylsulphonylaminophenyl)-ms-phenyl-formazane. | Cu | Do. |

EXAMPLE 10

4 parts of the copper-containing dyestuff obtained according to Example 9 are dissolved in 4000 parts of water and 100 parts of well wetted wool are introduced into the dyebath at 40–50°. The bath is brought to the boil within half an hour, kept boiling for 45 minutes and then the wool is rinsed with cold water and dried. A blue dyeing is obtained which has very good fastness to wet, alkali, rubbing and light.

What we claim is:

1. Dyestuffs of the formula

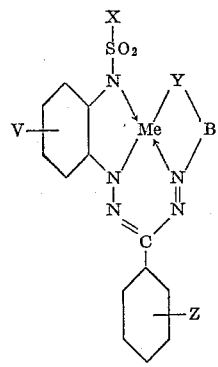

wherein
B is a member selected from the group consisting of unsubstituted phenyl, sulfophenyl, nitrophenyl, chlorophenyl, lower alkylsulfonylphenyl, phenylsulfonylphenyl, sulfamyl-phenylsulfonylphenyl, sulfophenylsulfonylphenyl, N - methylsulfamyl - phenylsulfonylphenyl, sulfamylphenylphenyl, chloromethyl - sulfonylphenyl, sulfamylphenyl, N-mono and di-lower alkylsulfamylphenyl, N-phenylsulfamylphenyl, N-parahydroxyphenylsulfamylphenyl, N-phenyl-N-lower alkylsulfamylphenyl, N-sulfophenyl-N-lower alkylsulfamylphenyl, and N-sulfamyl-phenyl - N - lower alkyl-sulfamylphenyl, Me is a heavy metal selected from the group consisting of Cu and Ni, V is a member selected from the group consisting of hydrogen, methyl and methoxy, X is a member selected from the group consisting of lower aliphatic, phenyl, chlorophenyl, lower alkylphenyl, lower alkoxyphenyl, lower alkylsulphonylphenyl, sulphamylphenyl and N-lower alkylsulphamylphenyl, Y is a metal binding group in o-position to the azo bond selected from the group consisting of —O— and —OOC—, and Z is a member selected from the group consisting of hydrogen, chlorine, methyl and sulphonic acid.

2. The formazane dyestuff of the formula

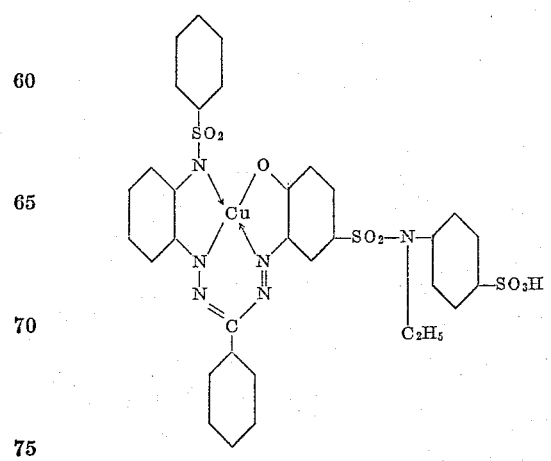

3. The formazane dyestuff of the formula
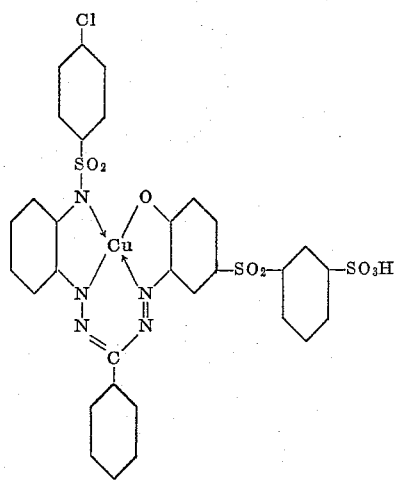
4. The formazane dyestuff of the formula
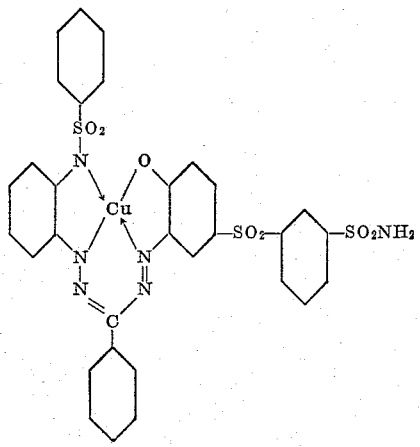
5. The formazane dyestuff of the formula
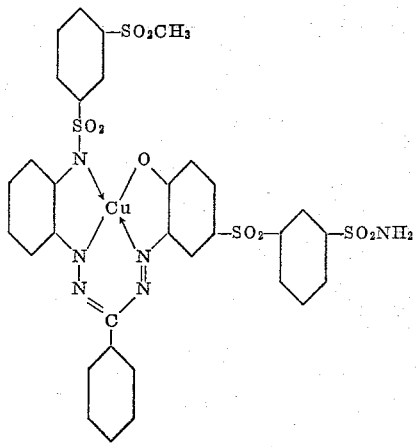
6. The formazane dyestuff of the formula
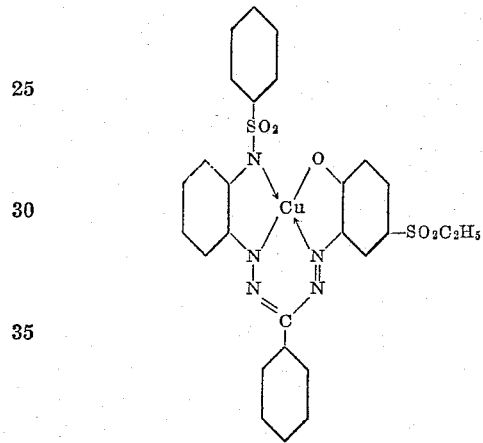
References Cited in the file of this patent
UNITED STATES PATENTS
| | | |
|---|---|---|
| 2,182,055 | Schweitzer | Dec. 5, 1939 |
| 2,662,074 | Brooks | Dec. 8, 1953 |
| 2,756,223 | Schetty | July 24, 1956 |
| 2,864,815 | Ziegler | Dec. 16, 1958 |
| 3,030,353 | Kuster | Apr. 17, 1962 |